Nov. 10, 1925.
J. HARRIS
DRY CELL BATTERY
Filed May 19, 1924
1,560,798
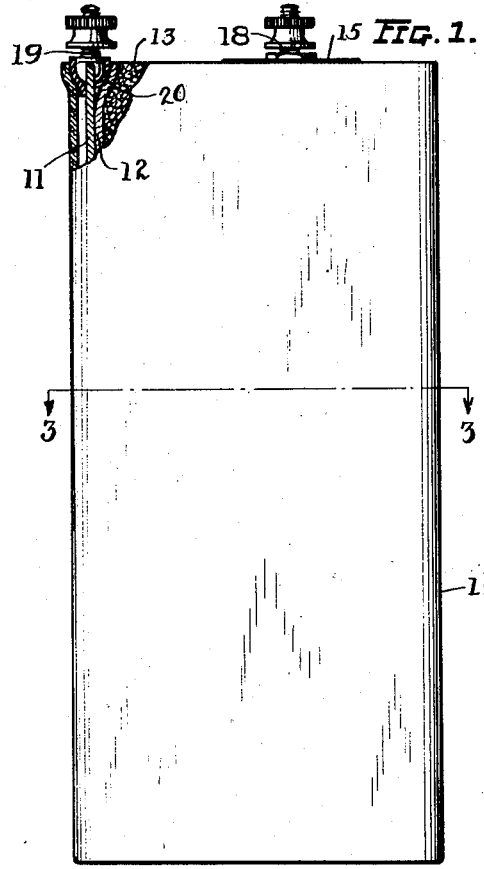
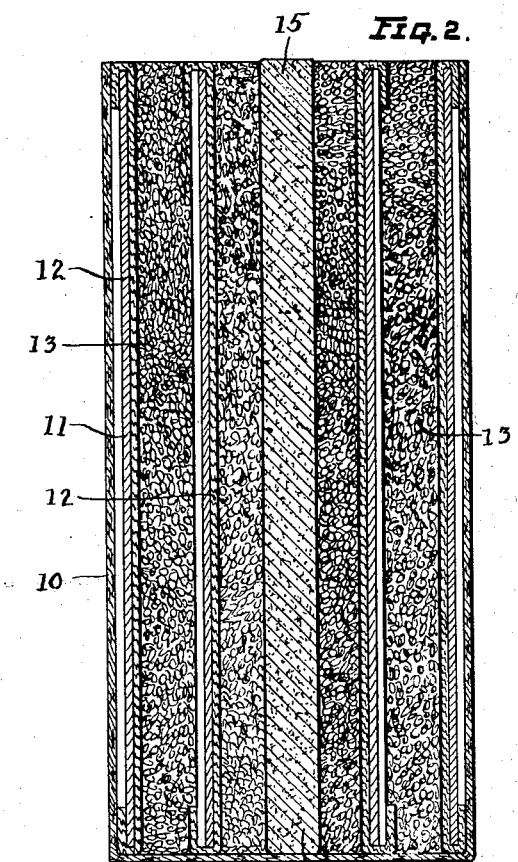
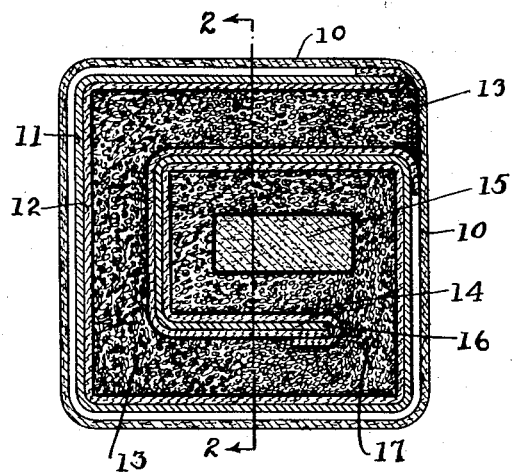
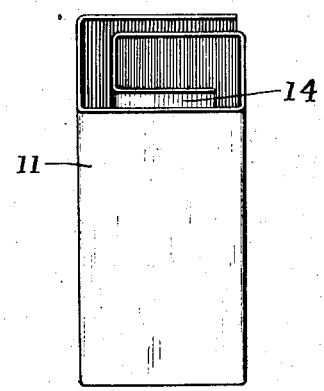
Inventor
John Harris
By *B. M. Kent*
Attorney Patented Nov. 10, 1925.

1,560,798

UNITED STATES PATENT OFFICE.

JOHN HARRIS, OF CLEVELAND, OHIO, ASSIGNOR TO CHARLES M. FULKERSON, OF CLEVELAND, OHIO.

DRY-CELL BATTERY.

Application filed May 19, 1924. Serial No. 714,310.

*To all whom it may concern:*

Be it known that I, JOHN HARRIS, a citizen of the United States, and a resident of Cleveland, county of Cuyahoga, State of Ohio, have invented certain new and useful Improvements in Dry-Cell Batteries, of which the following is a specification.

This invention relates to electric batteries and particularly to that class known as "dry" cells.

It is one of the objects of the invention to provide an improved form of battery that will have a relatively large ampere-hour capacity so as to adapt the battery especially for use in connection with radio apparatus.

It is a further object of the invention to provide an improved type of dry cell of practically standard dimensions but having a much larger ampere-hour capacity and hence longer life than the dry cells heretofore used.

A further object of the invention is to provide a dry battery which will be economical to manufacture and in which the zinc forming the anode is utilized in a more efficient manner than has been the case with batteries heretofore used.

Other objects of the invention and the features of novelty will be apparent from the following description taken in connection with the accompanying drawings, of which:

Figure 1 is a side elevation of a dry cell embodying my invention, a portion of the drawing being in section;

Fig. 2 is a longitudinal section on the line 2—2 of Fig. 3;

Fig. 3 is a transverse section on the line 3—3 or Fig. 1; and

Fig. 4 is a perspective view of the zinc anode made in accordance with my invention.

Referring to the drawings, 10 indicates a suitable container, pereferably made of paper, for cheapness, and so formed as to be water and airtight, and a good insulator. The construction of these containers is well known to those skilled in the art and hence a detailed description is superfluous. Within the container 10, which may be of any suitable shape but which I prefer to make rectangular and usually square, there is a zinc anode 11 in the form of a rectangular spiral, the outer portion of which conforms to the shape of the container 10, as will be seen in Fig. 3. The zinc anode 11 is covered by a pulp paper lining 12 which is so placed as to prevent the "mix" or depolarizing compound 13, which fills the battery, from coming in contact with the plate. The "mix" or compound 13 may be the usual manganese dioxide mixture that is commonly used in dry battery construction and the formula of this "mix" forms no part of the present invention. It is well understood by those skiled in the art that it is absolutely necessary to prevent the "mix" 13 from contacting with the anode 11 at any point in the battery and it is common to use a paper lining such as I have indicated at 12, for this purpose.

Within the inner coil 14 of the anode 11 I arrange the carbon cathode 15 which preferably extends the full height of the cell, as shown in Fig. 2.

The inner end of the coil 14, indicated at 16, in Fig. 3, is spaced away from the outer coil to provide a space 17, which is filled with the "mix" and which establishes communication between the interior of the outer coil and the interior of the inner coil so that the current will flow through the "mix" from all of the exposed surfaces of the anode 11 to the cathode 15, the only portions of the anode not active being the outer surface of the outer coil which lies adjacent to the interior wall of the container.

A binding post 18 is secured to the carbon 15 in the usual manner and a binding post 19 is secured to the zinc anode 11 in such a manner as to be insulated from the "mix", as shown in Fig. 1. In this form of construction I have indicated a rubber tube 20 as surrounding the binding post 19 and covered by the lining 12. Any other suitable form of connection and insulation may be employed.

The form of the anode makes it possible to utilize a very large part of its total surface as "active" and this gives large capacity to the cell. In the case of the inner coil 14 both sides of that portion of the anode are active.

The construction described has the advantage of being simple and easy to manufacture and yet providing the desired large capacity in a relatively small container.

I have not illustrated the means which I will employ for insulating the top of the cell as this forms no part of the present invention and is, therefore, not requisite to the present disclosure.

While I have illustrated a rectangular spiral yet it will be obvious that the principles of the invention may be carried out with other forms and I, therefore, intend to cover all constructions that come within the scope of the appended claim.

Having thus described my invention, what I claim is:

In a single-cell dry battery, the combination of a cathode, an anode surrounding said cathode and consisting of a sheet of active material arranged in general spiral form, and a depolarizing mixture in which said cathode is embedded arranged in spiral form between the convolutions of the anode whereby the opposite sides of a portion of the anode are presented to said mixture and a continuous current path is provided between the cathode and all active surfaces of the anode.

In testimony whereof I affix my signature.

JOHN HARRIS.